UNITED STATES PATENT OFFICE.

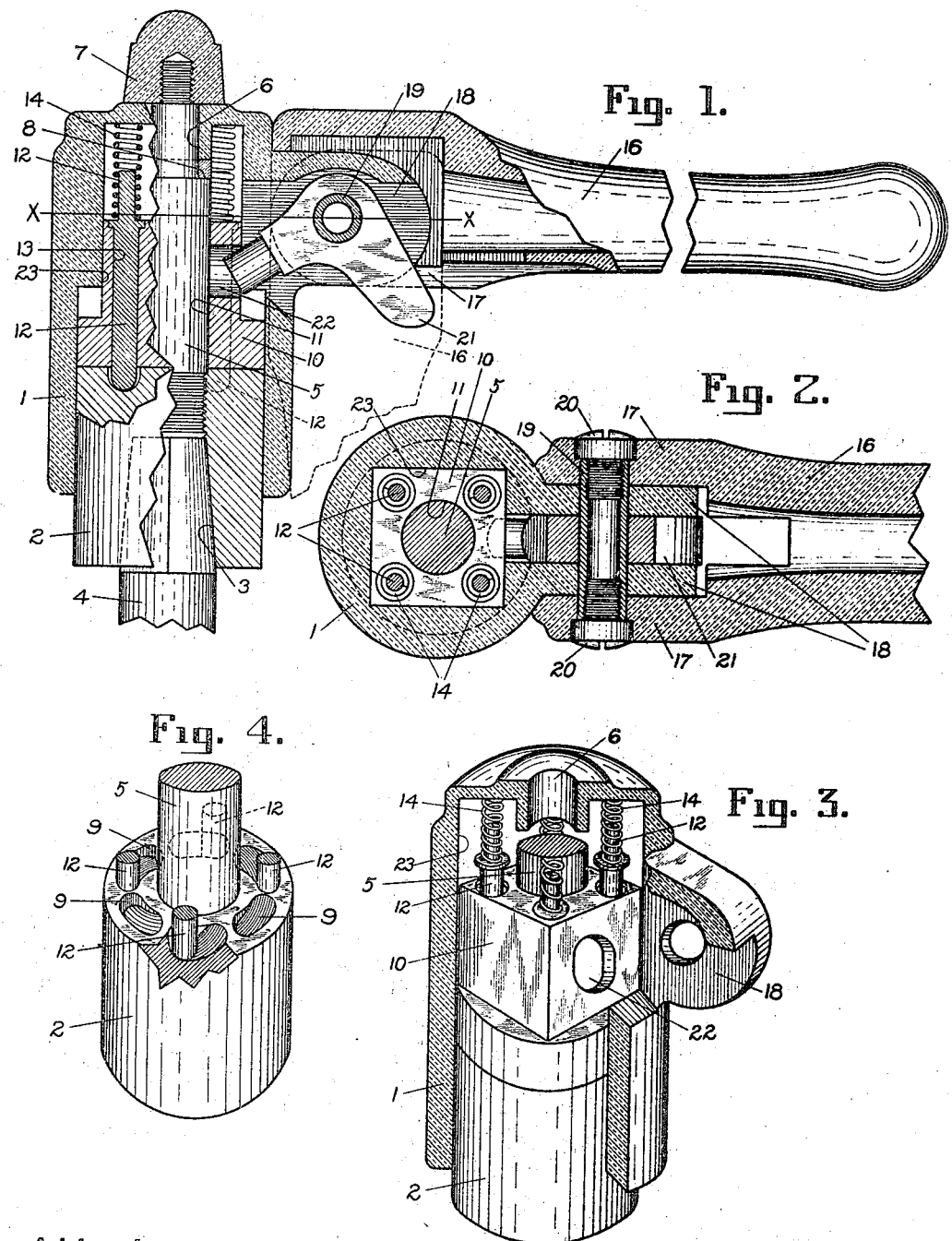

JOSEPH ECKERT, OF DAYTON, OHIO, ASSIGNOR TO THE DAYTON MANUFACTURING COMPANY, OF DAYTON, OHIO, A CORPORATION OF OHIO.

BRAKE-HANDLE.

1,241,359.

Specification of Letters Patent. Patented Sept. 25, 1917.

Application filed December 20, 1915. Serial No. 67,709.

*To all whom it may concern:*

Be it known that I, JOSEPH ECKERT, a citizen of the United States, residing at Dayton, in the county of Montgomery and State of Ohio, have invented certain new and useful Improvements in Brake-Handles, of which the following is a specification, reference being had therein to the accompanying drawing.

This invention relates to brake operating devices, and more particularly to that class of brake operating devices commonly used on car platforms and similar places and which is provided with an operating handle movable into an inoperative position, substantially parallel with the brake standard, and having means whereby the movement of the handle into its inoperative position will disconnect the same from the brake standard, to permit the latter to have movement in a reverse direction independently of the handle.

The object of the present invention is to provide a brake actuating device of this character which will be of a very simple, strong construction, and which can be manufactured at a comparatively low cost. To this end it is a further object of the invention to provide such a device having a small number of parts and having these parts of such a character that they will not be difficult to produce. It is also an object of the invention to provide a device of this kind comprising a pawl and ratchet clutch in which the pawls will have movement both with and independently of the pawl carrying member; and to provide an improved handle-operated means for moving the pawl carrying member and its pawls away from the other member of the clutch. Other objects and various advantages of the invention will appear as the latter is described.

In the accompanying drawings, Figure 1 is a longitudinal sectional view taken centrally through a device embodying my invention; Fig. 2 is a transverse section taken on the line x—x of Fig. 1; Fig. 3 is a perspective view, partly in section, of the housing and the parts contained therein; and Fig. 4 is a detail view of the toothed member.

In carrying out my invention, I provide a rotatable member which is adapted for connection with, and may if desired, be formed integral with, the brake standard or staff, and which is provided at one end with ratchet teeth. Coöperating with this rotatable member is a second member, movable toward and away from the first member and having yieldable pawls arranged to coöperate with the teeth of the first member. This second member is mounted upon a suitable supporting structure and is held against rotation relatively thereto, and the supporting structure is provided with a handle for rotating the same, which handle is movable into an inoperative position parallel with the brake standard and is so connected with the second member that when the handle is moved into its inoperative position the second, or pawl carrying member, will be moved away from the first member to release the latter and permit it to rotate in a reverse direction independently of the handle when the brakes are released.

This mechanism may take various forms, and in the present drawings I have illustrated one embodiment of the invention and have shown the same as comprising a supporting structure, or housing 1, in which is rotatably mounted a member 2 adapted to be connected with the brake standard in any suitable manner. In the present instance this rotatable member is provided with a squared socket 3 to receive the squared end of the brake standard 4. The rotatable member 2 preferably extends into the lower part of the housing 1 so as to have bearing therein, and is connected with the housing by means of a stud 5 which is rigidly secured to the rotatable member, centrally thereof, and extends through and is journaled in a bearing 6 formed in the upper end of the housing 1, in which it is held by means of a nut 7 screw threaded onto the end of the stud which projects beyond the end of the housing. The stud is provided with a shoulder 8 which is opposed to the inner end of the bearing 6 and coöperates with the nut 7 to hold the stud and the rotatable member 2 against longitudinal movement. The rotatable member 2 is provided at its upper end with ratchet teeth 9 which are arranged concentrically with the axis thereof, and in the present instance are provided by forming recesses in the end of the rotatable member.

Mounted within the housing 1, adjacent to the toothed end of the rotatable member 2, is a second member 10, which is here shown in the form of a slidable block, or plunger, having a longitudinal bore 11 to receive the stud 5 and having mounted thereon a plurality of pawls to coöperate with the teeth 9 of the rotatable member 2. In the present form of the device these pawls are in the form of pins 12 slidably mounted in guideways 13 formed in the slide block substantially parallel with the stud 5. The slide block and the pawls are loosely mounted in their respective guideways and ordinarily gravity will serve to move the same downward when they are free to so move, this downward movement being limited by shoulders at the upper ends of the pins. Brake actuating devices of this character are used very largely as emergency devices and frequently are not operated for long periods and to guard against the possibility of the pins, or pawls, sticking, under such circumstances, I have shown the same as spring actuated. It will be obvious that the springs may be applied to the several pawls in any suitable manner, but in the form here shown I have utilized separate springs 14 which are interposed between the closed end of the housing 1 and the respective pins 12. While the pawls may be arranged in any suitable manner with relation to the coöperating teeth I prefer to utilize some such arrangement as that shown in Figs. 3 and 4, in which figures the arrangement is such that when two of the pawls are in operative engagement with their respective teeth each of the other two pawls will be in the space between two adjacent teeth. With this arrangement one or more of the pawls is always in operative engagement with the teeth, except when the pawl carrying member, or slide block, has been moved away from the toothed member, and a very short pick-up movement is provided without the use of small teeth.

The pawl carrying member 10 is held against rotation relatively to the housing and a handle 16 is mounted on the housing to rotate the same, and thus, through the pawl carrying member and the toothed member 2, to rotate the brake standard. The handle is pivotally mounted on the housing to enable it to be moved into an inoperative position substantially parallel with the brake standard, as shown in dotted lines in Fig. 1. Preferably that end of the handle which is secured to the housing is hollow and the side walls thereof constitute ears, as shown at 17, which embrace other ears 18 secured to and preferably formed integral with the housing. A pivot pin 19 extends through the two sets of ears and is secured in position therein by means of screws 20. This interlocking connection between the handle and the housing provides a very strong construction for actuating the brakes and at the same time permits the handle to have free pivotal movement into its inoperative position, the lower side of the hollow portion of the handle being open to permit of this pivotal movement. Means are provided for causing longitudinal movement to be imparted to the pawl carrying member 10 by the movement of the handle into its inoperative position. To this end I have mounted an actuating member 21 on the housing and have arranged the same to be operated by the handle when the latter moves downward about its axis. As here shown, this actuating member is in the form of a lever arranged between the ears 18 of the housing, and it is preferably mounted upon the pivot pin 19. One arm of the lever extends into the housing and into a recess or socket 22 in the pawl carrying member 10, and the other arm of the lever projects from between the ears 18 into the path of a part of the handle 16. The lever is so arranged with relation to the handle that it will not be engaged thereby until near the completion of the movement of the handle, and, therefore, it does not interfere with the movement of the handle into its inoperative position. The pawl carrying member may be held against rotation in any suitable manner, but in the present instance I have shown the upper portion thereof as squared and as fitting within the squared guideway 23 in the housing.

The operation of the device will be readily understood from the foregoing description thereof, and it will be apparent that it is of a very simple but very strong construction, that it comprises but a few parts, and that these parts are of such a character that they can be produced without difficulty; and further, it will be apparent that the construction and arrangement of the parts are such that the mechanism will not readily become disarranged or be rendered inoperative.

While I have shown and described one embodiment of my invention, I wish it to be understood that this has been chosen for the purpose of illustration only, and that I do not desire to be limited to the details of construction herein shown and described, as obvious modifications will occur to a person skilled in the art. For example, it will be obvious that the manner of mounting the handle and actuating the pawl carrying member may be utilized with various types of pawl carrying members, regardless of whether or not the pawls are yieldable.

Having now fully described my invention what I claim as new, and desire to secure by Letters Patent is:—

1. A device of the character described, comprising a rotatable housing, a member rotatably mounted in said housing and having teeth at one end thereof, a second member mounted in said housing for movement therein toward and away from the toothed member, pins slidably mounted in said second member for movement both with and independently of the same toward and away from said toothed member, a handle mounted on said supporting structure to rotate the same and having pivotal movement relatively thereto, and a device pivotally mounted on said housing, having one end connected with said second member and having its other end arranged to be engaged by said handle when pivotal movement is imparted to the latter, whereby the pivotal movement of said handle will move said second member and its pins away from said toothed member.

2. A device of the characted described, comprising a housing, a toothed member rotatably mounted in said housing, a second member mounted in said housing for axial movement toward and away from said toothed member and held against rotation relatively to said housing, a lever pivotally mounted on said housing and having one end connected with said second member to impart axial movement thereto, a handle mounted on said housing to rotate the same, having pivotal movement, and so arranged that the pivotal movement thereof will cause it to engage said lever and actuate said second member, and pins slidably mounted in said second member to coöperate with said toothed member when said housing is rotated.

3. In a device of the character described, a housing open at one end and having a bearing at the other end; a rotatable member mounted in the open end of said housing, a stud rigidly secured to said rotatable member and journaled in said bearing, means to hold said stud and said rotatable member against axial movement relatively to said housing, said rotatable member having teeth in the inner end thereof, a plunger slidably mounted in said housing and having a longitudinal bore to receive said stud and also having longitudinal guideways, pins slidably mounted in said guideways and adapted to coöperate with the teeth of said rotatable member, a handle mounted on said housing and having pivotal movement, an actuating device mounted on said housing, having a part operatively connected with said plunger and having another part extending into the path of said handle when the latter is moved about its axis.

4. A device of the character described, comprising a housing having an opening in one side thereof and ears projecting on opposite sides of said opening, a member rotatably mounted in said housing and having teeth at the inner end thereof, a second member mounted in said housing for movement toward and away from the first mentioned member and held against rotation relatively to said housing, pawls carried by said second member to coöperate about the teeth of the first mentioned member, an actuating device mounted on said ears and operatively connected with said second member, a handle having a hollow end portion and adapted to embrace said ears, and means to pivotally connect said handle to said ears, said handle having a part arranged to operatively engage said actuating device when pivotal movement in one direction is imparted to said handle.

5. A device of the character described, comprising a housing, a rotatable member mounted in said housing, a pawl and ratchet mechanism for connecting said housing with said rotatable member, said housing having laterally projecting ears spaced apart, a lever pivotally mounted between said ears, and having an arm extending into said housing and connected with one member of said pawl and ratchet mechanism, and a handle having a bifurcated portion embracing said ears and pivotally connected thereto and having a part to engage said lever when pivotal movement is imparted to said handle.

6. In a device of the character described, a rotatable member having in one end thereof recesses forming ratchet teeth, a second member mounted for movement toward and away from the first-mentioned member, pawls yieldably mounted on said second member to coöperate with the teeth of said first-mentioned member and so arranged with relation to said teeth that when one pawl is in operative engagement with one of said teeth another pawl will be in engagement with the space between two of said recesses, a handle capable of two movements, and a connection between said handle and said second member to cause rotary movement to be imparted to said second member by one movement of said handle and to cause said second member and its pawls to be moved away from the first-mentioned member by the other movement of said handle.

7. A device of the character described, comprising a rotatable member having in one end thereof recesses forming ratchet teeth, a rotatable housing into which the toothed end of said member extends, a second member mounted in said housing for movement relatively thereto toward and away from said toothed member and held against rotation relatively to said housing, pins slidably mounted in said second member to coöperate with said toothed member and so arranged with relation to said teeth that when one pawl is in engagement with one of said teeth another pawl will be in engagement with the space between the said recesses, a handle pivotally mounted on said housing to rotate the same, and a connection between said handle and said second member to cause said second member to be moved away from said first-mentioned member by the pivotal movement of said handle.

8. A device of the character described, comprising a rotatable member having in one end thereof recesses forming ratchet teeth, a rotatable housing into which the toothed end of said member extends, a second member mounted in said housing for movement relatively thereto toward and away from said toothed member and held against rotation relatively to said housing, pins slidably mounted in said second member to coöperate with said toothed member and so arranged with relation to said teeth that when one pawl is in engagement with one of said teeth another pawl will be in engagement with the space between the said recesses, a handle pivotally mounted on said housing to rotate the same, and an actuating device mounted on said housing, connected with said second member and arranged to be actuated by the pivotal movement of said handle to cause said second member to be moved away from the toothed member by the pivotal movement of said handle.

9. In a device of the character described, a rotatable housing, a member rotatably mounted in said housing, a second member mounted in said housing for axial movement toward and away from the first-mentioned member and held against rotatory movement relatively to said housing, said members having coöperating parts, the coöperation of which is controlled by the axial movement of said second member, a handle pivotally mounted on said housing to rotate the same, and an actuating device pivotally mounted on said housing independently of said handle, connected with said second member and arranged to be actuated by the pivotal movement of said handle to impart axial movement to said second member.

10. In a device of the character described, a rotatable housing, a member rotatably mounted in said housing, a second member mounted in said housing for axial movement toward and away from the first mentioned member and held against rotatory movement relatively to said housing, said members having coöperating parts, the coöperation of which is controlled by the axial movement of said second member, a handle pivotally mounted on said housing to rotate the same, an actuating device movably mounted on said housing independently of said handle, connected with said second member and arranged to be actuated by the pivotal movement of said handle to impart axial movement to said second member.

11. In a device of the character described, a rotatable member having ratchet teeth at one end thereof, a second member mounted for movement toward and away from the first-mentioned member and having pawls to coöperate with the teeth of the first-mentioned member, a handle mounted independently of said second member and capable of two movements, a connection between said handle and said second member to cause rotatory movement to be imparted to said second member and its pawls by one movement of said handle, and an actuating device connected with said second member, mounted independently of said handle and arranged to be actuated by the other movement of said handle to cause axial movement to be imparted to said second member and its pawls.

12. In a device of the character described, a rotatable member having ratchet teeth at one end thereof, a second member mounted for movement toward and away from the first-mentioned member and having pawls to coöperate with the teeth of the first-mentioned member, a handle mounted independently of said second member and capable of two movements, a connection between said handle and said second member to cause rotatory movement to be imparted to said second member and its pawls by one movement of said handle, and a lever pivotally mounted independently of both said handle and said second member, having one end operatively connected with said second member and having its other end arranged to be engaged by said handle during the other movement thereof to cause axial movement to be imparted to said second member and its pawls.

In testimony whereof, I affix my signature hereto.

JOSEPH ECKERT.

Copies of this patent may be obtained for five cents each, by addressing the "Commissioner of Patents, Washington, D. C."